J. D. PEDERSEN.
FIREARM.
APPLICATION FILED SEPT. 30, 1908.
963,171.
Patented July 5, 1910.
7 SHEETS—SHEET 1.
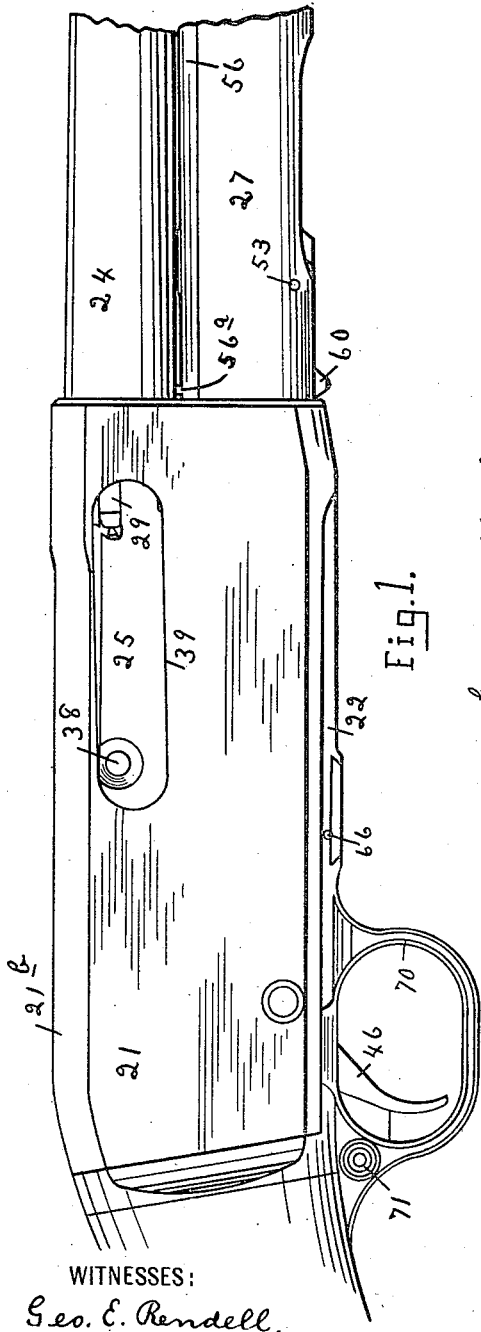
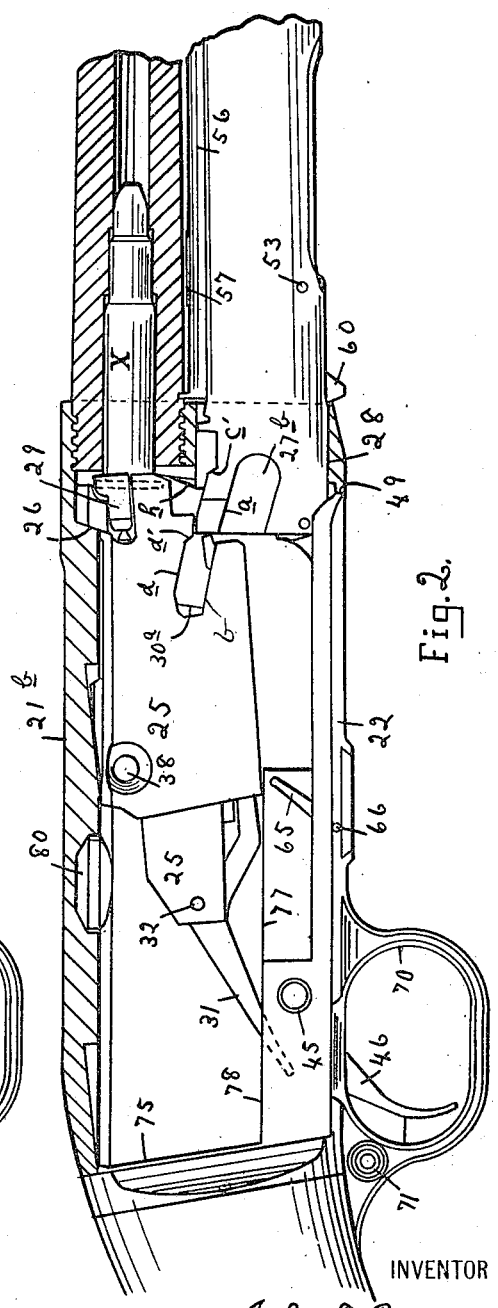
WITNESSES:
Geo. E. Rendell.
E. S. Hesse.
INVENTOR
John D. Pedersen
BY Robinson, Martin & Jones
ATTORNEYS

J. D. PEDERSEN.
FIREARM.
APPLICATION FILED SEPT. 30, 1908.

963,171.

Patented July 5, 1910.
7 SHEETS—SHEET 2.

WITNESSES:
Geo. E. Rendell
Sarah E. Clark.

INVENTOR
John D. Pedersen
BY Robinson, Martin & Jones
ATTORNEY

J. D. PEDERSEN.
FIREARM.
APPLICATION FILED SEPT. 30, 1908.
963,171.
Patented July 5, 1910.
7 SHEETS—SHEET 3.
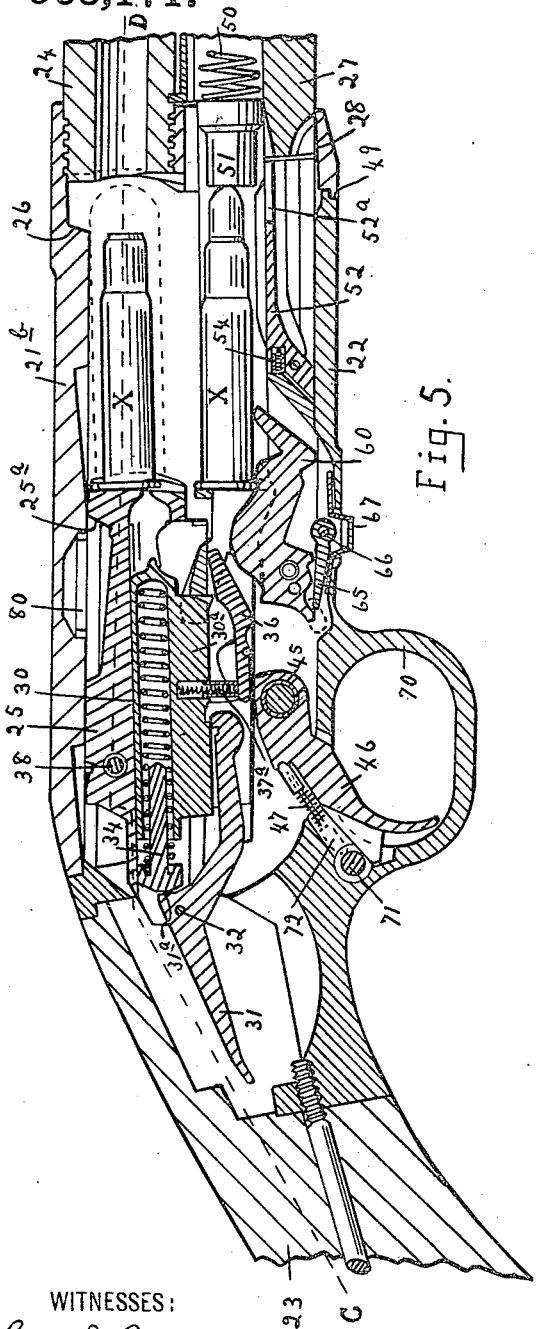
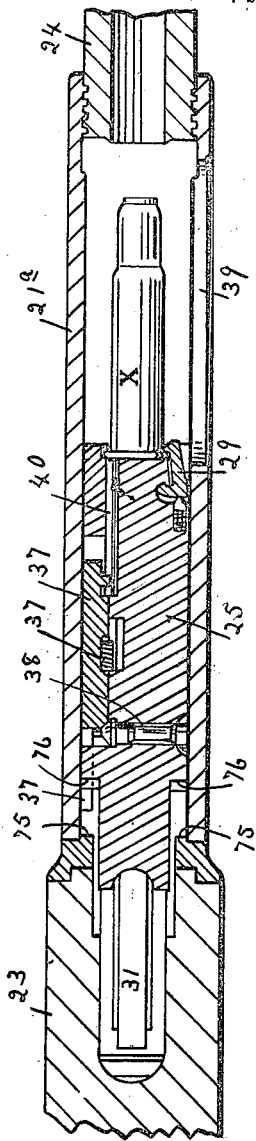
WITNESSES:
Geo. E. Rendell.
E. S. Hesse.
INVENTOR
John D. Pedersen
BY Robinson, Martin & Jones
ATTORNEYS J. D. PEDERSEN.
FIREARM.
APPLICATION FILED SEPT. 30, 1908.
963,171.
Patented July 5, 1910.
7 SHEETS—SHEET 4.
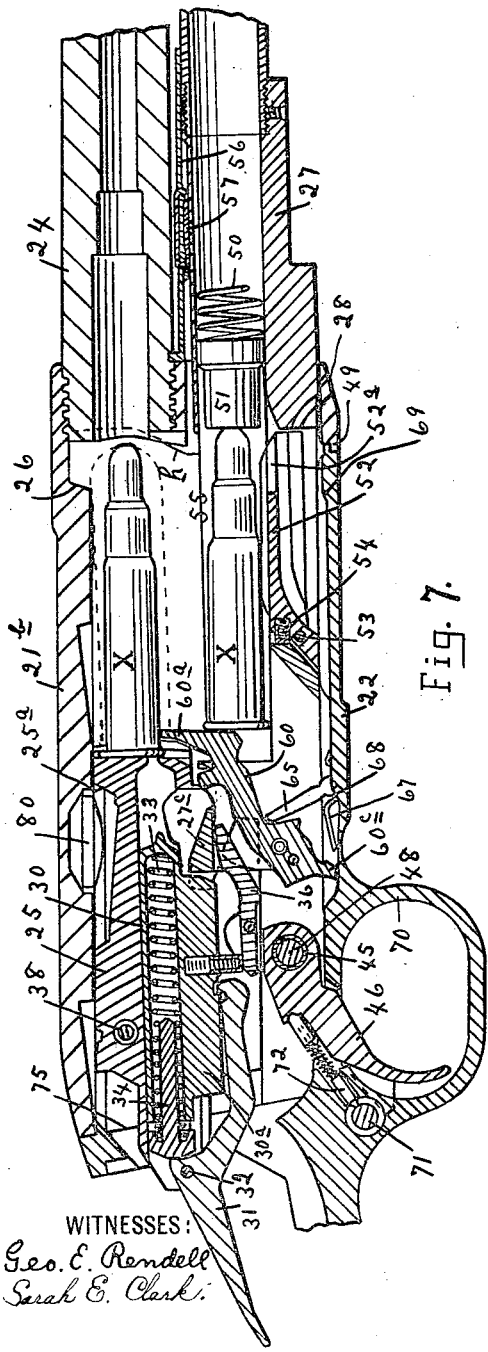
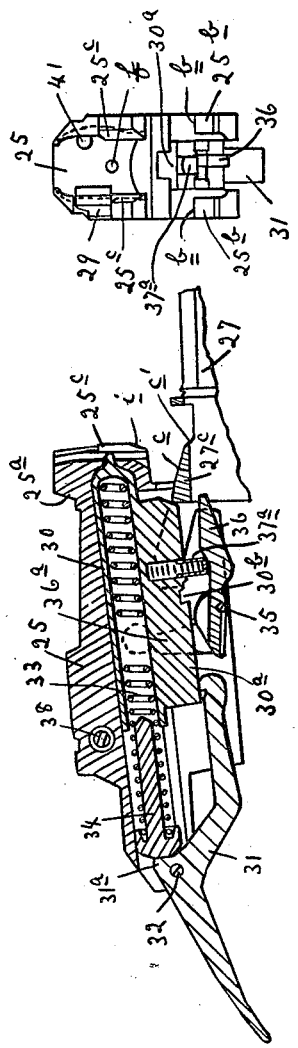
WITNESSES:
Geo. E. Rendell
Sarah E. Clark.
INVENTOR
John D. Pedersen
BY Robinson, Martin & Jones
ATTORNEYS

J. D. PEDERSEN.
FIREARM.
APPLICATION FILED SEPT. 30, 1908.

963,171.

Patented July 5, 1910.
7 SHEETS—SHEET 5.

WITNESSES:
Geo. E. Rendell
Sarah E. Clark.

INVENTOR
John D. Pedersen
BY Robinson, Martin & Jones
ATTORNEYS

J. D. PEDERSEN.
FIREARM.
APPLICATION FILED SEPT. 30, 1908.
963,171.
Patented July 5, 1910.
7 SHEETS—SHEET 6.
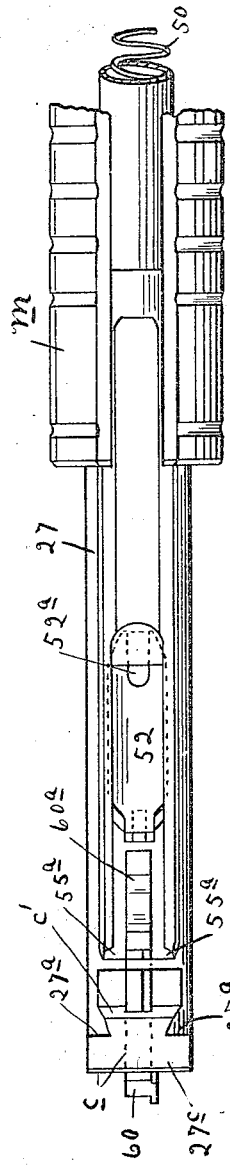
Fig. 12.
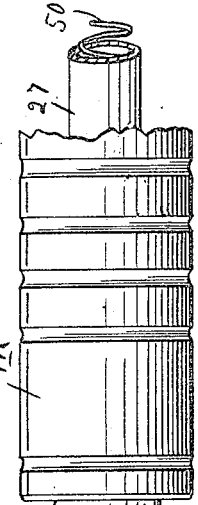
Fig. 13.
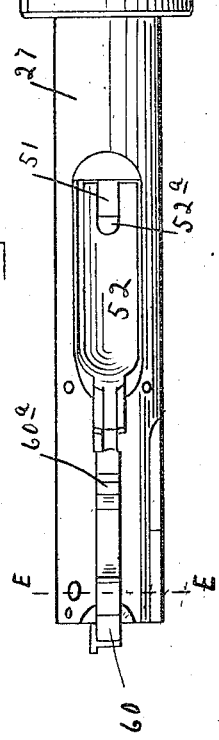
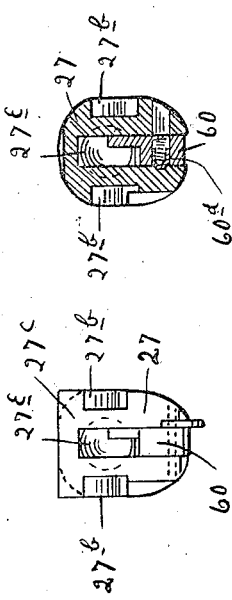
Fig. 15.
Fig. 14.
WITNESSES:
Geo. E. Rendell
Sarah E. Clark.
INVENTOR
John D. Pedersen
BY Robinson, Martin & Jones
ATTORNEYS

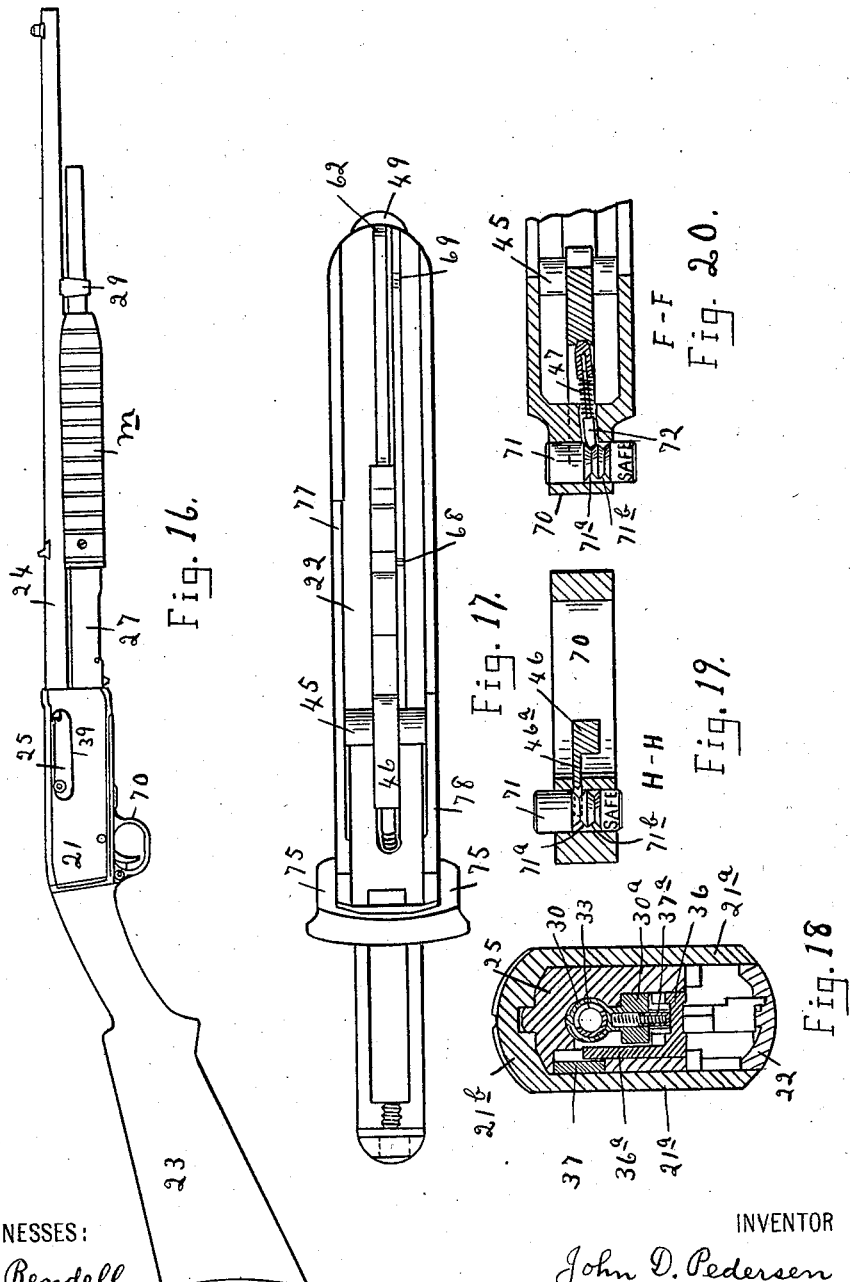

UNITED STATES PATENT OFFICE.

JOHN D. PEDERSEN, OF JACKSON, WYOMING.

FIREARM.

963,171. Specification of Letters Patent. Patented July 5, 1910.

Application filed September 30, 1908. Serial No. 455,586.

*To all whom it may concern:*

Be it known that I, JOHN D. PEDERSEN, of Jackson, in the county of Uinta and State of Wyoming, have invented certain new and useful Improvements in Firearms; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide an improved left-hand slide action firearm, which is particularly adapted to high power ammunition and which is simple and efficient and well adapted to meet the requirements in cost and method of construction and weight and appearance.

Figure 3:
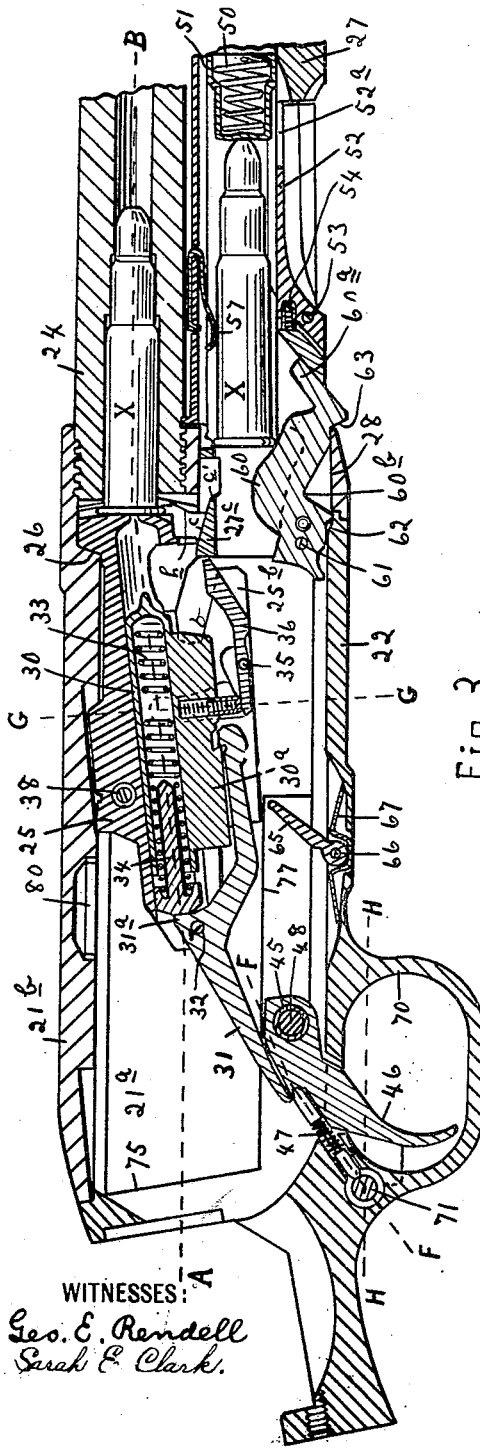
Figure 4:
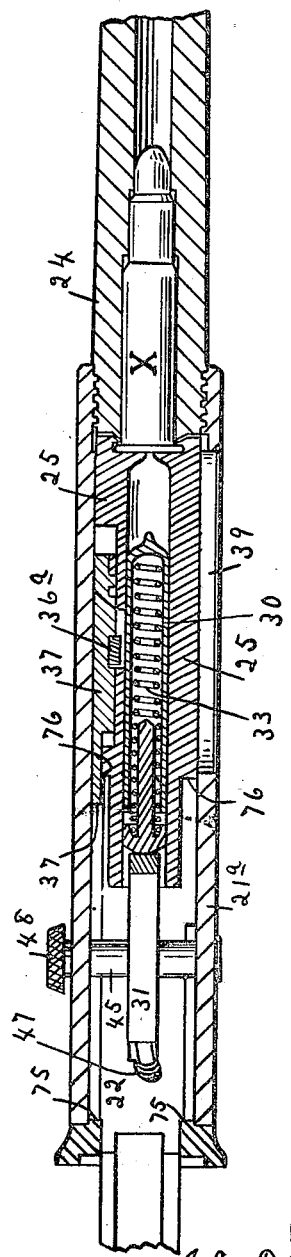
Figure 10:
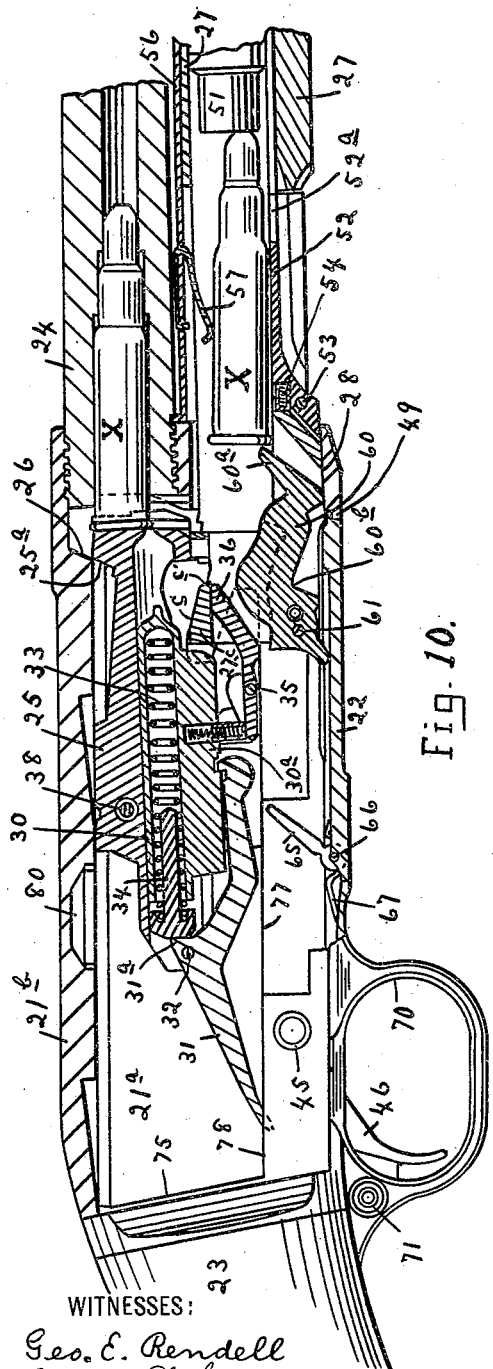
Figure 11:
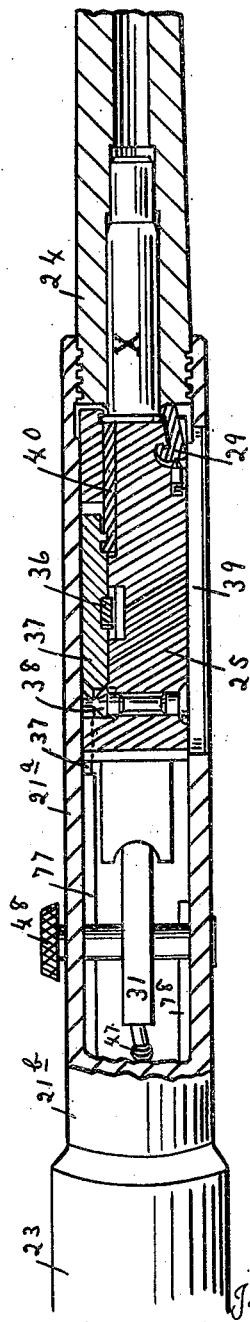

Figure 1 shows a side elevation of the frame portion of the firearm in connection with immediately adjacent parts on either end. Fig. 2 shows a partial vertical section of the frame and barrel in connection with a side elevation of certain other parts; more particularly the breech block magazine-action bar and trigger plate. Fig. 3 is a vertical longitudinal section of the frame and mechanism taken on the central line. Fig. 4 is a horizontal sectional view of the frame, breech block and other parts taken mainly on line A—B of Fig. 3. Fig. 5 is a similar section to Fig. 3 with the breech block in nearly its fully opened position. Fig. 6 is a sectional view taken on line C—D of Fig. 5. Fig. 7 is a similar longitudinal section view to Fig. 5 with the breech block in completely open position, in a position preparatory to closing. Fig. 8 is a longitudinal vertical sectional view of the breech block with connecting coöperating parts in the position which the parts assume immediately after firing. Fig. 9 is a front end elevation of the breech block, together with some of its attached parts. Fig. 10 is a similar sectional view to that shown in Fig. 7 with the breech block and parts in the position which they assume just prior to the breech being completely closed and locked. Fig. 11 is a horizontal section similar to that shown in Fig. 6 with the parts, however, in a different position. Fig. 12 is a top or plane view of the rear part of the magazine-action bar with its appurtenances including a portion of the firearm operating handle. Fig. 13 is a bottom view of the same. Fig. 14 is a rear end view of the magazine-action bar. Fig. 15 is a cross section on line E—E of Fig. 13 of the rear end of the action bar shown, however, in proper upright position. Fig. 16 is a general side elevation of the gun on a reduced scale. Fig. 17 is a top or plan view of the portion of the frame generally called the trigger plate. Fig. 18 is a cross section of the frame breech block and other parts taken on line G—G of Fig. 3. Fig. 19 shows the safety lock in connection with a section of the frame taken on line H—H of Fig. 3. Fig. 20 is a similar view taken on line F—F of the same figure.

Referring to the reference letters and figures in a more particular description, 21 indicates the frame, which generally speaking includes the trigger plate 22 to which the butt stock 23 is attached and separable from the part 21, while the barrel 24 is secured in the usual manner in the forward end of the frame part 21. The frame is recessed to provide a chamber receiving the working parts and particularly the breech block 25, which fits in between the side walls $21^a$ of the frame, whereby it is confined laterally but between which it is free to move vertically and longitudinally. The frame 21 also includes solid and integral with the side walls 21 a top plate $21^b$ in which is formed the frame recoil shoulder 26, the same being the rear somewhat inclined wall or surface of a recess into the top plate immediately at the rear end of the barrel 24. The breech block 25 is provided with the recoil shoulder $25^a$, which coöperates with the shoulder 26 to secure the breech block against rearward movement or recoil when they are engaged and the arm is fired. For operating the breech block both in its reciprocating movement to open and close the breech, as well as in its vertical or transverse movement, to among other things engage and disengage the recoil shoulders, there is provided an action bar 27 which is also a tubular magazine. This action bar is arranged to slide longitudinally in a bearing at 28 in the forward lower portion of the frame and in a loop $n$ secured forwardly to the underside of the barrel. The magazine-action bar is provided with a fore stock or handle $m$ by means of which the action bar is reciprocated manually. In assembling, the magazine-action bar is inserted through the frame from the rear end when the trigger plate or butt stock part is removed, and the forward movement of the magazine-action bar with its appurtenances is adapted to be positively limited by the shoulders 27$^a$ of the action bar engaging with the portion of the frame which surrounds the opening or bearing 28 in which the rear end of the action bar is supported. The rear end of the action bar is provided on either side with notches or recesses 27$^b$ adapted to receive the projections 25$^b$ on the side walls of the breech block, the upper side of the recess 27$^b$ providing an acute angle camming or wedging surface $a$ adapted to coöperate with a substantially similar inclined or wedging surface $b$ on the upper side of the projection 25$^b$. The rear end of the magazine-action bar is cut away largely but still provides a cross bar 27$^c$, the upper surface of which provides an acute wedging or cam face $c$ (Figs. 10 and 12) and an abrupt cam shoulder $c'$ adapted to coöperate with the cam faces $d$ Fig. 2 in each wall of the breech block, which cam faces are particularly provided with an abrupt or obtuse angle portion $d'$ as compared with the acute cam face $b$. In the breeched-up and locked position the rear end of the magazine-action bar 27 has a bearing in the frame at 28 where it is substantially supported, and the forward ends of the cam faces $d$ rest upon the top of the cross bar 27$^c$ supporting the forward end of the block positively against downward movement with the recoil shoulders fully engaged. In opening the breech block the action bar is manually moved rearwardly, and among other things the cam faces $a$ engage and ride down the cam faces $b$ on the breech block first giving the forward end of the breech block a transverse downward movement until the recoil shoulders are disengaged, when the block is free to be moved longitudinally rearward by the action bar, and at the same time is sufficiently coupled to the action bar to allow the action bar to have control of its movement. The clearance as between the cam faces $b$ and $d$ on the breech block is sufficient to allow the downward movement of the forward end of the breech block in unlocking.

The face of the breech block 25 is provided with lips or ribs 25$^c$ extending substantially vertically on either side of the face, except at the bottom, which is open, and at the top where they curve inwardly and are adapted to engage the head of a cartridge as X and secure it by the head projecting from the face of the block. At one side of the front end of the breech block there is provided an extractor 29, the hook portion of which practically provides a continuance of one of the lip edges at the point occupied by it. In a longitudinal opening in the breech block is mounted the firing pin 30, which has on its underside an elongated enlargement 30$^a$ containing the sear catch notch 30$^b$ and providing at its front end an abutment against which the cross bar 27$^c$ of the magazine-action bar is adapted to engage. The forward end of the firing pin is provided with the usual point or tip adapted to be projected through the opening $f$ in the face of the breech block to strike the cartridge cap or primer. The sear 31 is pivotally mounted at 32 in the rear end of the breech block and is provided with a somewhat elongated arm extending forwardly and having a hook shoulder adapted to engage in the firing pin sear notch and the somewhat elongated backwardly extending arm adapted to engage with the trigger. The firing pin is provided with a longitudinal chamber containing the main spring 33, which at its forward end bears directly against the closed forward end of this chamber and at the rear end is received by and on a cap pin 34, which bears on a short arm 31$^a$ of the sear direct; thus full force of the main spring 33 is utilized on the firing pin for performing its ordinary functions, while at the opposite end the spring serves to operate the sear to its locking position and acting on the short lever or arm, therefore, its tension is sufficiently modified to make it available and unobjectionable for the purpose of operating the sear.

Mounted on a pivot 35 in the walls of the breech block 25 is the action bar lock 36, the forward end of which when in operative position is adapted to engage with the cross bar 27$^c$ of the action bar, and when in inoperative position adapted to enter the recess 27$^e$ beneath the cross bar 27$^c$ in the rear end of the action bar. For operating the action bar lock into its active and inactive positions, there is provided in the underside of the firing pin a spring pressed push pin 37$^a$. When the firing pin is in its rear or cocked position the push pin 37$^a$ is moved to the rear of the pivot 35 and operates to throw up the forward end of the action bar lock into engaging position with the cross bar 27$^c$. Whereas when the firing pin is in its forward or fired position the push pin 37 has been shifted to a position forwardly of the pivot 35, whereby it acts to throw down the forward end of the action bar lock and place it in its inactive position. Further, the action bar lock 36 is provided at its rear end at one side with an upwardly projecting arm 36$^a$ arranged in a suitable recess in the block to allow it freedom of movement, and at its upper end engaging with a sliding push bar and inertia piece 37$^b$ mounted in a longitudinal slot-like groove in one side of the breech block. For manually releasing the action bar lock there is provided in the breech block a transverse push pin 38 having a wedging head (Fig. 11) adapted to engage a shoulder on the bar 37 and force it in a forward direction when the pin is pushed transversely by the operator. The action bar catch release or push pin 38 is accessible to the operator through the cartridge shell ejecting opening 39 in the right-hand side wall of the frame. Coupled to the forward end of the inertia bar 37ᵇ is the shell ejector consisting of a pin 40 Fig. 11 arranged in a longitudinal hole 41 opening out through the face of the breech block.

In order to provide a sufficiently powerful primary extraction to start shells stuck in the barrel chamber, the frame is provided adjacent to the rear end of the barrel with cam shoulders $h$ (Fig. 3) with their faces inclining downwardly and rearwardly, while the front end of the breech block is provided with coöperating cam faces $i$. Thus when the forward end of the block is moved downwardly in the preliminary unlocking movement, the cam faces $i$ on the block run and ride on the cam faces $h$ of the frame forcing the block rearwardly with a relatively slow but powerful movement, and the lips 25ᶜ and extractor 29 having a hold of the head of the cartridge start it from the chamber with certainty and without undue exertion on the part of the operator. Pivotally mounted on a tubular pivot 45 in the trigger plate part 22 of the frame is the trigger 46, which is adapted when the breech block is in closed and locked position to engage with the rearwardly projecting arm of the sear 31. The trigger is held up in position to engage without loss of motion the sear 31 by means of a compression spring 47 mounted on a spring spindle and bearing at one end against the trigger. The tubular pivot 45 affords a passage for a thumb screw bolt 48 by means of which the rear portion of the trigger plate is secured to the rear portion of the main frame 21, while the forward end of the trigger plate 22 is engaged with the forward portion of the main part of the frame by being provided with a tenon and mortise at 49.

As before suggested, the magazine is provided in the magazine-action bar 27 and is of the tubular form provided with a spring 50 and a follower 51, the two operating to force the cartridges rearwardly in the magazine. The magazine is loaded from the underside through an opening closed by a trap door 52, the same being pivoted in the magazine-action bar at 53 and provided with a spring at 54 for forcing it into closed position. The door 52 is concave on its outer side in order to adapt it readily to receive and guide a cartridge while introducing it into the magazine and is further cut away on its forward end, as indicated at 52ᵃ, whereby or through which the follower or the rear end of a cartridge already in the magazine can be readily engaged by the forward end of a cartridge about to be introduced into the magazine and forced forwardly in loading the magazine; and further, this opening or cut-away allows the user to observe whether or not there are any cartridges contained in the magazine.

The magazine is provided on the top or upper side at the rear end with a cartridge outlet opening 55. This opening is provided at the rear end particularly with notches as 55ᵃ, (Fig. 12) through which the rim of a cartridge head is adapted to pass, and the shoulders of which notches are adapted to engage the head of the cartridge when positioned therein and prevent longitudinal movement of the cartridge with reference to the magazine-action bar. To the rear of the notches 55ᵃ the magazine is closed against the passage of cartridges. For closing the opening 55 when the firearm is closed or breeched-up, there is provided a cover 56 interposed between the under side of the barrel and the top of the magazine-action bar and running in ways on top of the action bar and held against longitudinal movement as the action bar reciprocates by being provided with a lip 56ᵃ engaging a slight notch in the underside of the barrel. Mounted in this cover 56 is a spring 57 adapted when the breech block is in closed position to bear upon the top of the rearmost cartridge in the magazine and among other things prevent it from slipping forwardly when the muzzle of the gun is held downwardly and a cartridge is being introduced into the magazine, at which time the tension of the spring 50 to hold the cartridge to the rear end of the magazine is removed. As the magazine-action bar is moved rearwardly and the cartridge outlet opening 55 passes beyond the spring 57, this spring is forced upwardly and rides on the upper wall of the magazine-action bar while it is in its rearward position.

Mounted on a pivot 61 in the rear end of the magazine-action bar is a cartridge carrier 60. This carrier as to its forward portion particularly swings in a recess 27ᵉ provided in the rear end of the action bar and is provided with a nose 60ᵃ adapted to engage the cartridge and move it upwardly through the opening 55 and up the face of the breech block with the head engaged with the lips 25ᶜ on the face. This leaves the cartridge projecting in line with the barrel from the forward face of the breech block supported by said lips. As the magazine-action bar is started in its rearward movement, the forward end of the carrier is given a slight preliminary uplift by either a projection on the carrier engaging with a cam 62 on the forward end of the trigger plate, or the cam face 63 engaging with the front end of the frame, or both. This preliminary uplift serves to raise the rim at the head of the cartridge into the recess 55$^a$, whereby it is secured to the magazine-action bar, and no matter how rapidly thereafter the action bar may be moved rearwardly the inertia of the cartridge will be ineffective in displacing the cartridge from its proper position opposite the outlet opening 55 from the magazine. As the action bar is moved rearwardly it engages and rides down into the position shown in Fig. 5 the carrier dog 65, which dog is pivoted on a transverse pin 66 in the trigger plate and is normally erected into a somewhat upright position by the spring 67. When the action bar has passed sufficiently to the rearward the swinging end of the carrier dog 65 swings upwardly so as to engage in the angle or socket 60$^b$ of the carrier on the forward movement. When in its upper operative position after having passed a cartridge out through the magazine outlet opening 55, the forward end of the carrier 60 serves as a stop to limit the rearward movement of the next preceding cartridge in the magazine, which moved back by the magazine spring 50 and follower 51, or these together with intermediate cartridges. In the forward movement of the action bar after the carrier has been elevated by engagement with the carrier dog 65 and has moved over the dog and turned it down, the carrier is moved partially down toward its normal position by the tail projection 60$^c$ riding over a cam 68 on the trigger plate, and is finally forced down into its final position by the same tail projection 60$^c$ riding over the farther cam 69 also on the trigger plate.

A safety lock is provided in a transverse opening in the rear of the trigger guard 70 consisting of a cylindrical plug 71 adapted to be reached at each end for manual manipulation, and provided with two circumferential grooves 71$^a$ and 71$^b$ placed nearer one end than the other. This safety device may be shifted with reference to a rearward projection 46$^a$ of the trigger, so as to have this projection either strike the full body of the safety device or swing into one of the circumferential grooves or notches therein. In case the safety is shifted so that the part 46$^a$ strikes the body, all movement of the trigger is prevented. In the other case sufficient movement is allowed to allow the trigger to operate the sear in the usual manner. For retaining the safety device in its position in the transverse opening in the trigger guard from displacement as well as to provide a click or catch to maintain it in either of its positions of adjustment, there is provided on the rear end of the trigger spring 47 a cap 72 having a conical end adapted to engage in either of the circumferential grooves or recesses, but capable of being forced out so as to pass from one to the other by sufficient force applied to either end of the safety device. The cap 72 is received in a hole or recess in the frame or trigger guard in such manner as to prevent its lateral movement in connection with the movement of the safety device.

In addition to such suggestions as have been previously made as to the mode of operation of this firearm, it may now be added that when the safety device is in proper position to permit the movement of the trigger the trigger may be moved to operate the sear and release the firing pin. The firing pin is projected forward by the action of the main spring and operates to explode the cartridge in the usual manner. At the time that the firing pin moves forward the position of the push pin controlling the action bar lock is shifted to the forward side of the pivot of said lock and in position to operate the action bar lock into its releasing position. If at this time the operator is drawing rearwardly with considerable force on the fore stock, the rear end of the action bar may bind the action bar lock so as to prevent it moving even under the influence of the spring push pin to its releasing position. When the recoil of the gun, however, takes place the inertia of the sliding bar 37 is added to the force of the spring push pin and these together are sufficient to release the action bar lock even though the operator should fail to release the backward draw on the fore stock, which ordinarily takes place in connection with the recoil at the time the cartridge is discharged. The cartridge having been discharged and the action bar released, the operation of unlocking preparatory to opening the breech takes place. It will be noted that the action bar operating on the acute angled slides or cam faces $b$ is allowed comparatively a large amount of backward movement, while producing a very small amount of downward movement on the forward end of the breech block. This provides for the forward end of the breech block being moved downwardly with much force. The preliminary extraction cams $h$ and $i$ being in engagement on the said downward movement of the front end of the breech block serve to move the block backwardly a limited distance also with a great deal of force, which force is utilized in starting the shell from the chamber. This is an important function in high power firearms where the shell is apt to become tightly expanded in the cartridge chamber. When the breech block has been dropped at its forward end sufficiently to disengage the recoil shoulders 25$^a$ and 26, the breech block is free to move rearwardly under the control of the action bar. It should have been noted previously that when the firing pin is released and moves to its forward position the front end of the lower enlargement 30ª thereof takes a position opposite the rear end of the action bar, so that as the action bar is moved rearwardly and at the time that the block is being moved downwardly at its forward end the firing pin is forced rearwardly against the tension of the main spring. The arrangement is such, however, that in this movement the firing pin will not be moved rearwardly sufficiently to bring the sear catch notch 30ᵇ into position to be engaged by the sear. Therefore, at the time that the breech block becomes free to move rearwardly under the control of the action bar the firing pin is pressed forwardly against it under the influence of the main spring. The angular arrangement of the cam shoulders as between the breech block and action bar, however, prevents the block and action bar from becoming disengaged. As the breech block is moved rearwardly the rear end of the bar 37ᵇ finally strikes the fixed shoulder 75 on the frame. This causes the ejector pin to be projected beyond the face of the breech block, and the same engaging with the cartridge head at one side forces it out from under the lip 25ᶜ and the cartridge head turning on the extractor hook as a pivot is thrown out through the opening 39 in the side of the frame.

It may be noted that at a point opposite the ejector pin the inner face of the lip 25ᶜ on the breech block is sufficiently beveled off to allow the ejector to force that side of the cartridge head from under the lip, the extractor on the opposite side yielding sufficiently to permit this being done. In the extracting operation, the main spring serves to accelerate the ejector when the breech block is being moved rearwardly very slightly for the reason that it takes some power with the rear end of the bar 37 bearing against the shoulder 75 to force the edge of the cartridge from under the lip, and this power being supplied through the action bar, the main spring causes a sufficient snap at the final releasing of the cartridge head to effectually eject it from the arm. The breech block finally comes to a stop in its rearward movement by the shoulders 76 engaging with a pair of shoulders 75 on both sides of the frame. A slight additional rearward movement of the action bar at this time will bring the firing pin to its fully cocked position and allow it to be caught in such by the sear. It may be here noted that in its reciprocating movements the rear end of the breech block ridges or travels on ways 77 and 78 provided on the trigger plate part of the frame. When the action bar is moved forwardly, it brings along the breech block without undue friction against the top plate of the frame by reason of the abrupt cam shoulders d' engaging with the abrupt shoulder c' of the action bar. It might be stated that if these shoulders were as acute as the cams b, the breech block would bind against the top of the frame with such force as to make the operation difficult or impossible. As the breech block moves backward the carrier engages with the carrier dog and is moved quickly into its upper position carrying the cartridge out of the magazine and forcing it up the face of the breech block to a position in line with the barrel. The rocking relative movement of the carrier dog in connection with the carrier is one that obviates friction and shock and is considered particularly advantageous. As the breech block nears its closed position the carrier is operated to its normal position, as before pointed out. When the breech block has reached its nearly closed position where the recoil shoulders begin to engage the forward end of the breech block, it is forced up with much power by the elongated acute angled cam c on the top of the action bar acting on the cam faces of the breech block. This in connection with the angular camming position of the recoil shoulders enables the breech block to force a shell into the chamber with a great deal of power providing it is required.

To enable the breech block to be disengaged from the action bar or engaged therewith in taking down or assembling the parts, there is provided in the top plate of the frame a recess 80 into which the projection of the breech block carrying the recoil shoulder may be introduced to allow a sufficient vertical displacement of the breech block to disengage it from the action bar. It might be further noted that on the forward movement of the breech block with its operating parts, there is no binding or pinching, usually called "overdraw", due to the firing mechanism passing the cocking mechanism.

It is evident that modifications and changes in and from the construction herein described may be made without departing from the invention described in and intended to be covered by the claims.

What I claim as new and desire to secure by Letters Patent is:

1. In a fire-arm, the combination with a breech-block, of a reciprocating tubular magazine action-bar independent of said breech-block and having means for securing a cartridge therein against longitudinal movement, and means, operating at the initial rearward movement of said magazine action-bar, for shifting the position of the cartridge vertically into engagement with said securing means.

2. The combination, in a fire-arm, of a breech-block, a reciprocating tubular magazine action-bar separate from or independent of said breech-block, means for securing the cartridge, at the point of delivery in front of the breech-block, against longitudinal movement in the magazine action-bar, means for shifting the cartridge vertically one stage and at the initial rearward movement of said magazine action-bar into engagement with the securing means, and means for subsequently shifting the cartridge vertically in a second stage to a position in front of the breech-block.

3. The combination, in a fire-arm, of a frame having a recoil shoulder, a breech-block longitudinally and vertically movable into and out of engagement with the said recoil shoulder, and a reciprocating tubular magazine action-bar connected with the breech block to move the same longitudinally and vertically, and means on said magazine action-bar for securing a cartridge therein against longitudinal movement.

4. A reciprocating tubular magazine-action bar having a vertical outlet opening adjacent to the rear end, means for moving the cartridge partially in the outlet opening at the beginning of the rearward movement and moving the cartridge entirely out of the cartridge opening during the forward reciprocating movement.

5. A reciprocating tubular magazine-action bar having a vertical outlet opening including shoulders for engaging the rim of a cartridge head, a cartridge carrier and means for operating the cartridge carrier in two stages—first, to bring the cartridge into engagement with said shoulders, and second, to expel the cartridge entirely from the outlet opening of the magazine.

6. A tubular magazine having a vertical outlet opening, a breech block having on its face a cartridge head receiving groove registering with the magazine outlet opening, a cartridge carrier and means for actuating the carrier in two stages—first, to move the cartridge partially into the outlet opening, and second, out of the opening and up the face of the block.

7. A tubular magazine-action bar, a breech block having means for receiving and supporting a cartridge projecting from its face, a cartridge carrier on the action bar and a spring erected carrier actuating dog on the frame.

8. The combination in a fire arm of a breech block mounted for reciprocation in the frame, a tubular magazine-action bar connected to the breech block and having a vertical cartridge outlet opening directly in front of the breech block, a cartridge carrier, means for moving the carrier in the primary opening movement of the action bar to move the cartridge partially into the outlet opening, substantially as set forth.

9. The combination in a fire arm of a frame having a recoil shoulder adjacent to the rear end of the barrel, a breech block having a recoil shoulder adjacent to its forward end and mounted in the frame for a transverse movement at its forward end to engage and to disengage the recoil shoulders, and having a reciprocating movement to open the breech, a spring actuated firing pin arranged in the central vertical plane of the fire arm in the breech block, a sear catch to secure the firing pin and an action bar arranged in the central vertical plane engaging in the breech block to transversely operate and reciprocately operate the same and having a limited relative movement with reference to the breech block and engaging and retracting the firing pin, substantially as set forth.

10. The combination of a breech block, a sear and firing pin mounted in the breech block, and a main spring housed in said firing pin and serving to operate said sear and pin.

11. The combination of a breech-block, a firing pin mounted in the breech-block, a sear pivoted to the breech block and having a short lever arm, and a main spring housed in said firing pin and acting on the latter and on the short arm of the said sear, to operate both.

12. The combination, in a fire-arm, of a breech block, a tubular reciprocating magazine action-bar provided on its upper side at its rear end with an outlet opening, a non-reciprocating cover closing said opening when the said action-bar is in its forward position and the gun is breeched up, and a cartridge-engaging friction-spring mounted on said cover and extending within the chamber of the said action-bar so as to engage the rearmost cartridge therein when the said action-bar is in its forward position.

13. The combination in a fire arm of a breech block and a tubular reciprocating magazine-action bar connected to the breech block, a vertical cartridge outlet opening in the magazine-action bar adjacent to the breech block, a fixed cover for said outlet opening and a cartridge engaging friction spring mounted on said cover, substantially as set forth.

14. The combination in a fire arm of a tubular reciprocating magazine-action bar having a vertical cartridge outlet opening, a stationary cover arranged to close the outlet opening when the action bar is in its forward position, and a cartridge engaging friction spring mounted on said cover, substantially as set forth.

15. The combination in a fire arm of a frame, a breech block, a reciprocating magazine-action bar connected with the breech block, a cartridge carrier mounted in the magazine-action bar and a pivoted dog mounted on the frame and arranged to engage and actuate the carrier in the forward movement of the action bar, substantially as set forth.

16. The combination in a fire arm of a frame, a breech block, a reciprocating magazine-action bar connected with the breech block, a cartridge carrier pivotally mounted in the magazine-action bar, and a pivoted spring erected dog mounted on the frame and arranged to engage and elevate the carrier in a forward movement of the action bar and to permit the action bar to ride over it in the rearward movement, substantially as set forth.

17. The combination in a fire arm of a breech block, a reciprocating magazine-action bar connected to the breech block, a cartridge carrier pivotally mounted in the magazine-action bar and a pivoted spring erected dog mounted on the frame and arranged to allow the carrier to ride over the same in the opening movement and to be erected and engage the carrier to operate the same in a forward movement, substantially as set forth.

18. The combination in a fire arm of a frame, a breech block reciprocating magazine-action bar connected to the breech block, a cartridge carrier pivotally mounted in the magazine-action bar, and a pivoted spring erected dog mounted on the frame and arranged to engage and actuate the carrier as it passes the same in one movement of the action bar and permit the carrier to pass the dog without being operated in the other movement of the action bar, substantially as set forth.

19. The combination in a fire arm of a barrel, a frame having a recoil shoulder and extraction cam face, a breech block having a recoil shoulder and extraction cam and mounted in the frame for longitudinal movement in opening and closing the breech and for transverse movement to engage and disengage the recoil shoulders and operate the extracting cams, of an action bar connected to the breech block for a limited independent longitudinal movement and operating on an elongated acute angle cam slide on the breech block in the opening movement and on an abrupt angle cam shoulder in the longitudinal closing movement, substantially as set forth.

20. The combination in a fire arm of a barrel frame recessed to receive the breech block and having a recoil shoulder, and an extraction cam face, a breech block having a recoil shoulder, and an extraction cam mounted in the frame for transverse movement to engage and disengage the recoil shoulders and for longitudinal movement to open and close the breech, an action bar connected to the breech block for a limited independent movement and operating on an acute angle slide on the breech block in the opening movement and on an abrupt angle cam shoulder in the longitudinal closing movement, substantially as set forth.

21. The combination in a fire arm of a barrel, a frame having a primary extraction cam face, a breech block having a coöperating extraction cam mounted in the frame for lateral and longitudinal movement, a longitudinally movable reciprocating action bar engaging the breech block by cam faces arranged generally transversely to the primary extraction cam, substantially as set forth.

22. The combination in a fire arm of a frame, a breech block, a reciprocating magazine-action bar, a carrier pivoted adjacent to its rear end in the action bar and having a socket in its bottom forward of the pivot and a carrier dog hinged to the frame and at its free end adapted to engage in the socket and actuate the carrier, substantially as set forth.

23. The combination in a firearm of a frame, a breech block, a reciprocating magazine-action bar, a carrier pivoted at the rear in the action bar, a carrier dog hinged to the frame to swing in one direction to permit the carrier to pass it and to swing in the other direction to operate the carrier as the carrier passes it in its longitudinal movement in the other direction, substantially as set forth.

24. A carrier pivotally mounted on an action bar for reciprocal movement and a spring-held dog arranged to engage and operate the carrier on its forward movement, substantially as set forth.

25. The combination in a fire arm of a barrel, a frame having a recoil shoulder adjacent to the rear end of the barrel and a primary extraction cam, a breech block having a recoil shoulder and coöperating primary extraction cam, and action bar cam slides arranged generally transversely to the extraction cams and a longitudinal reciprocating action bar having means for operating on the cam slides of the breech block, substantially as set forth.

26. In a fire-arm, the combination with a longitudinally sliding action-bar and a transversely and longitudinally movable breech-block operatively connected with said action-bar so as to be moved longitudinally and transversely by said bar, of means whereby, during the downward transverse unlocking movement of said breech-block, a slight longitudinal rearward movement, and which is of lesser extent than said transverse movement, will be imparted to said block to start a shell out of the barrel before the main shell-extracting operation is performed.

27. The combination in a fire arm of a barrel, a frame, a movable breech block and a longitudinally movable action bar, the frame and breech block having primary extraction cams operating on a transverse movement of the breech block, the action bar and breech block having cams to cause the transverse movement of the breech block, substantially as set forth.

28. The combination in a fire arm of a breech block action bar connected with the breech block by means permitting a limited independent movement of the action bar, an action bar lock, a firing pin mounted in the breech block and means on the firing pin controlling the action bar lock, substantially as set forth.

29. The combination in a fire arm of a breech block, an action bar connected with the breech block by means permitting a limited independent movement, an action bar lock pivotally mounted on the breech block, a firing pin mounted on the breech block and carrying a spring operating on the action bar lock and shifted to opposite sides of the pivot by the movement of the firing pin, substantially as set forth.

30. The combination in a fire arm of a breech block, an action bar connected with the breech block by means permitting a limited independent movement, an action bar lock pivotally mounted in the breech block, a spring for operating the action bar lock, means for shifting the spring to opposite sides of the pivot of the action bar lock, and an inertia piece connected with the action bar lock, substantially as set forth.

31. The combination in a fire arm of a breech block, an action bar connected with the breech block by means permitting a limited relative movement, an action bar lock mounted on the breech block and means entirely on the breech block for throwing the lock in and out of active position, substantially as set forth.

32. The combination in a fire arm of a frame, a barrel and breech block having means for engaging and supporting a cartridge projecting from its face, a tubular reciprocating magazine-action bar engaging the breech block and constructed to operate the same transversely and longitudinally, a cartridge carrier mounted in the magazine-action bar and means on the frame for actuating the cartridge carrier, substantially as set forth.

33. The combination in a fire arm of a breech block having means for engaging and supporting a cartridge projecting from its face, a magazine-action bar engaging the breech block and arranged to raise and lower the forward end of the breech block, an outlet opening from the magazine registering at the rear with the face of the breech block, a combined cartridge carrier and stop mounted in the action bar, and means on the frame for actuating the cartridge carrier, substantially as set forth.

34. The combination in a fire arm of a frame, a reciprocating breech block, a reciprocating action bar connected with the breech block, a spring actuated firing pin mounted in the breech block and engaging with the action bar, a sear mounted in the breech block and adapted to engage the firing pin, a cartridge ejector mounted on the breech block and adapted to strike and be actuated by a shoulder on the frame, substantially as set forth.

35. A breech block, action bar, action bar lock and manual means for releasing the action bar lock mounted entirely on the breech block.

36. The combination in a firearm of a frame, a reciprocating breech block, means for limiting the opening movement of the breech block, a firing pin mounted in the breech block, a main spring, a sear, means for operating the breech block and cocking the firing pin operating on the breech block through the medium of the main spring, which is overcome sufficiently to move the firing pin to its fully cocked position when the movement of the breech block has been limited, substantially as set forth.

37. A trigger safety lock consisting of a round body having two encircling grooves nearer one end than the other of said body and mounted for longitudinal movement in a transverse opening in the rear of the trigger-guard, in combination with a spring check arranged to engage either of said grooves, and a trigger projection arranged to engage the full portion of the body of the said trigger lock when the latter is in " safety " position, or to be received in one of said grooves when the lock is moved to firing position.

In witness whereof, I have affixed my signature, in presence of two witnesses, this 18th day of Sept. 1908.

JOHN D. PEDERSEN.

Witnesses:
SARAH E. CLARK,
EMMA S. HESSE.